United States Patent [19]

Young et al.

[11] Patent Number: 4,579,260

[45] Date of Patent: Apr. 1, 1986

[54] PLASTIC BLOW-MOLDED CONTAINER HAVING DISPENSING VALVE

[75] Inventors: William C. Young, Superior Township, Washtenaw County, Mich.; Richard C. Darr, Seville; Craig A. Larson, Westfield Court, both of Ohio

[73] Assignee: Plastipak Packaging, Inc., Plymouth, Mich.

[21] Appl. No.: 579,403

[22] Filed: Feb. 13, 1984

[51] Int. Cl.⁴ .................................. B65D 23/10
[52] U.S. Cl. .................. 222/465 R; 222/511; 215/1 C
[58] Field of Search .......... 222/143, 465 R, 468, 222/475, 511, 478, 481, 482; 220/72; 215/1 C; D9/374–376, 378, 381–382, 401, 407, 411–412, 447

[56] References Cited

U.S. PATENT DOCUMENTS

| | | | |
|---|---|---|---|
| D. 105,026 | 6/1937 | Mills | D9/411 |
| D. 227,345 | 6/1973 | Bell et al. | D9/374 |
| D. 245,577 | 8/1977 | Smythe | D9/374 |
| 3,443,728 | 5/1969 | Scholle | 222/511 |
| 3,536,500 | 10/1970 | Cleereman et al. | 215/1 C X |
| 3,708,082 | 1/1973 | Platte | 215/1 C |
| 4,046,275 | 9/1977 | Virog, Jr. et al. | 215/1 C |
| 4,412,633 | 11/1983 | Guerrazzi et al. | 222/468 |

FOREIGN PATENT DOCUMENTS 108952  4/1966  Norway ........................ 222/143

Primary Examiner—Charles A. Marmor
Attorney, Agent, or Firm—Brooks & Kushman

[57] ABSTRACT

A plastic blow-molded container (20) for liquids is disclosed as having particular utility for dispensing water and includes a body portion (22) with pairs of longer and shorter side walls (24, 26). At least one rib and preferably a pair of upper and lower ribs (30, 32) extend completely around the body portion along each of its side walls. The ribs project farther inward along the longer pair of side walls (24) than along the shorter pair of side walls (26). A generally flat bottom wall closes the bottom end of the body portion (22) and a top closure (40) closes the top end of the body portion. The top closure (40) includes an upper handle (42) and a spout (44) that projects upwardly in a vertical direction perpendicular to the bottom wall. A unitary valve (46) is mounted on the spout (44) and movable from a closed position to an open position to permit liquid dispensing when the container is supported sideways on one of its side walls. The ribs (30, 32) have a construction that provides the container with high strength. Spout (44) and handle (42) are positioned on the top closure in a manner that permits easy filling without leakage when stored while still permitting the dispensing with the container supported on one of the shorter side walls (26).

10 Claims, 11 Drawing Figures

PLASTIC BLOW-MOLDED CONTAINER HAVING DISPENSING VALVE

TECHNICAL FIELD

This invention relates to a plastic blow-molded container for holding liquids and having a valve by which the liquid contents can be dispensed. The valved container of the invention has particular utility for dispensing spring or distilled water although other uses are also possible.

BACKGROUND ART

Plastic blow-molded containers have previously been utilized to hold liquids such as spring, distilled, or tap water, etc. When utilized to hold water for drinking purposes, such containers have previously included valves for dispensing the water. Dispensing valves utilized with such containers have previously been of a multiple piece construction that is not particularly economical. See, for example, U.S. Pat. Nos. 3,430,824 and 3,493,146.

Plastic blow-molded containers for drinking water have previously utilized an upper handle and a bottom valve as shown by U.S. Pat. No. Des. 244,639. Any liquid leakage at the bottom valve can present a problem with this type of container since the valve is exposed to water until substantially the entire contents of the container have been emptied.

All of the containers disclosed by the above referenced patents have the valve mounted on an inclined spout which is necessary with the multiple piece valve constructions utilized to provide dispensing of the drinking water. However, such inclined spouts require that the container be supported in an inclined orientation upon filling which is much more difficult to execute than with the container supported straight up.

A multiple piece dispensing valve similar to the type utilized with the molded containers discussed above is disclosed by U.S. Pat. No. 3,223,117. Also, U.S. Pat. No. 3,400,866 discloses a unitary dispensing valve utilized with a bag liner that is positioned within a box with the valve projecting outwardly therefrom to provide dispensing of a liquid within the lined box.

DISCLOSURE OF INVENTION

An object of the present invention is to provide an improved plastic blow-molded container for dispensing liquids. This improved container has particular utility for use with water, especially spring water that is sold for storage within the consumer's refrigerator to kept cold for drinking purposes.

In carrying out the above object and other objects of the invention, the improved plastic blow-molded container for holding liquids includes a body portion having bottom and top ends and a generally flat bottom wall for closing the bottom end of the body portion. The container also includes a top closure for closing the top end of the body portion. At its top closure, the container is provided with an upper handle for carrying purposes and a spout that projects upwardly in a vertical direction perpendicular to the bottom wall. A unitary valve is mounted on the spout and movable from a closed position to an open position to permit dispensing of liquid contents of the container when supported sideways on the body portion.

Distinct advantages are achieved with the container described above especially when utilized for dispensing water. During filling of the container, the vertical spout facilitates the filling operation and the positioning thereof on the top closure adjacent the upper handle prevents leakage during shipment and storage prior to use by the consumer. Also, the unitary valve utilized with the blow-molded container is economical and yet effective in dispensing the water and thereby overcomes problems associated with prior art water containers.

In the preferred construction of the container, the body portion has first and second pairs of side walls. Both pairs of the side walls are generally flat with one pair having a substantially longer horizontal extent than the other pair. At least one inwardly projected rib is provided extending completely around the body portion along each of its side walls. The rib projects farther inward along the longer pair of side walls than along the shorter pair of side walls. This rib structure provides a high strength construction capable of withstanding the loading that is present when the container is filled with water.

Preferably, the container body portion includes a pair of the ribs which extend around all of the side walls at upper and lower locations. Each rib includes inclined rib walls that converge toward each other in an inward direction.

Along the longer side walls, the ribs include upper and lower curved rib walls. Each upper curved rib wall is located on the upper rib at the upper extremity thereof and has a curved shape that projects upwardly. Each lower curved rib wall is located on the lower rib at the lower extremity thereof and has a curved shape that projects downwardly. Each rib also includes a vertical connecting wall that connects the converging rib walls. This vertical connecting wall of each rib has an inwardly curved shape along the longer pair of side walls.

In a modified embodiment disclosed, the container has a deeper rib construction at the junctions of the side walls and along the shorter pair of side walls. In addition, the container includes vertically extending web reinforcers at each rib adjacent the junctions of the side walls. These web reinforcers prevent accordion-like compression of the container when subjected to vertical loading.

The handle of the container is located on the top closure centrally between the shorter pair of side walls. Between the central handle and one of the shorter side walls, the vertically extending spout is located with the valve mounted thereon to provide dispensing with the container positioned sideways on this one shorter side wall. The spout that mounts the valve has a compacted construction formed during the blow molding operation and includes a lower flange that can be utilized for positioning upon filling, an annular wall that projects upwardly from the flange, and an annular rib on the upper extremity of the annular wall for use in securing the unitary valve.

The objects, features, and advantages of the present invention are readily apparent from the following detailed description of the best modes for carrying out the invention when taken in connection with the accompanying drawings.

BEST MODES FOR CARRYING OUT THE INVENTION

Figure 1:
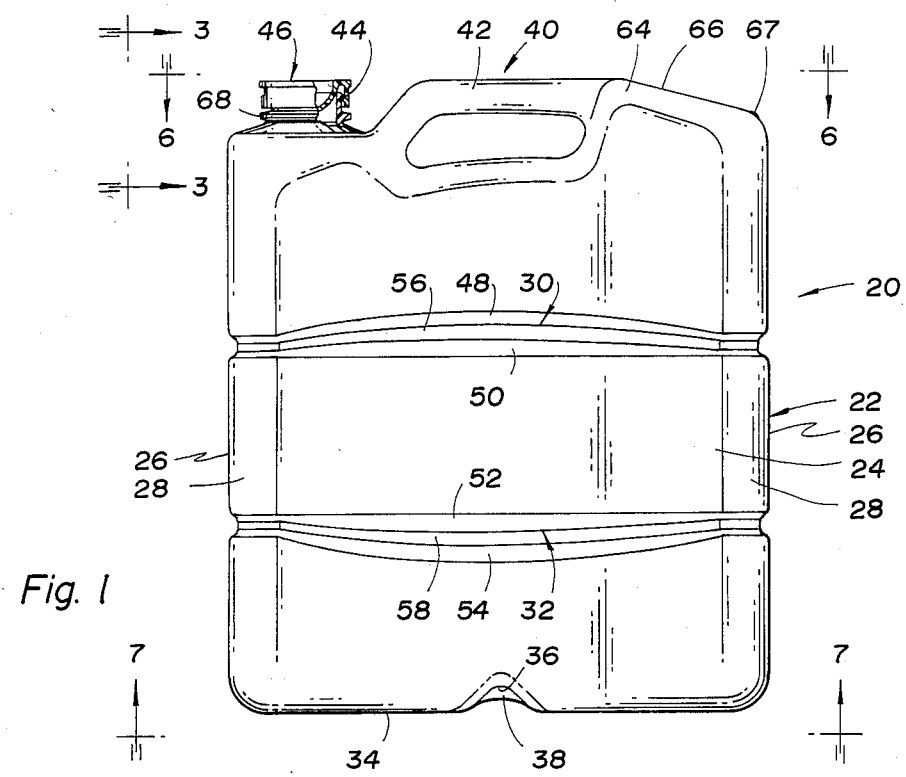
FIG. 1 is a side elevation view of a plastic blow-molded container constructed in accordance with the present invention and shown in an upright position.

With reference to FIG. 1 of the drawings, a plastic blow-molded container for liquids is constructed in accordance with the present invention and generally indicated by 20. As is hereinafter more fully described, container 20 has particular utility for use in dispensing water especially spring water that is used for drinking and cooking purposes.

Figure 6:
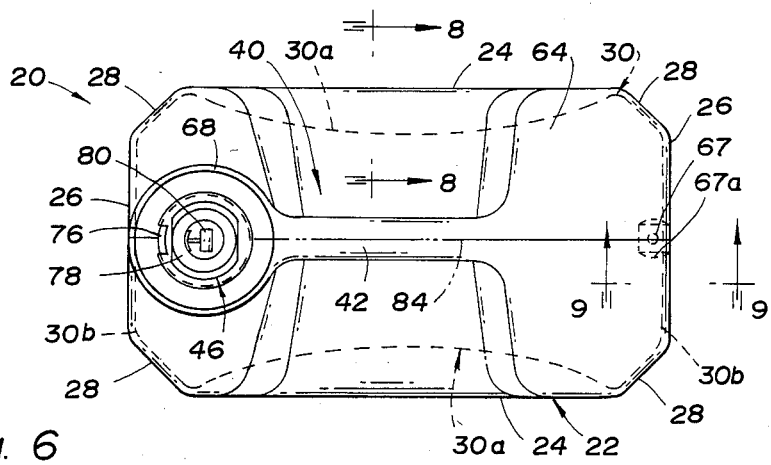
FIG. 6 is a top plan view of the container taken along the direction of line 6—6 in FIG. 1.
Figure 7:
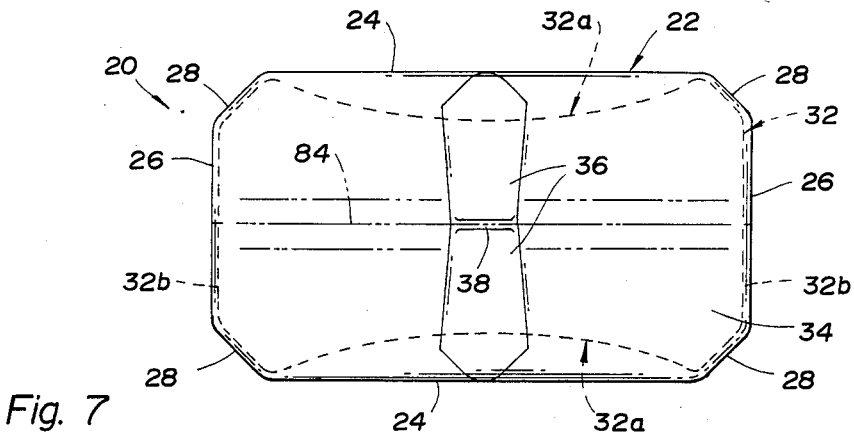
FIG. 7 is a bottom plan view of the container taken along the direction of line 7—7 of FIG. 1.

As seen in FIGS. 1, 6 and 7, container 20 includes a body portion 22 that preferably has first and second pairs of side walls 24 and 26. Both of the pairs of side walls 24 and 26 have generally flat constructions, with the one pair of side walls 24 having a substantially longer horizontal extent than the other pair of shorter side walls 26. As such, the container has a generally elongated rectangular shape as viewed in FIGS. 6 and 7. Side walls 24 and 26 have junctions 28 that are inclined at 45 degrees with respect to the side walls at each corner of the elongated rectangular configuration of the container.

Body portion 22 of the container 20 is preferably provided with at least one inwardly projecting rib and its preferably provided with a pair of such ribs as illustrated by 30 and 32 at upper and lower locations. Each of the ribs 30 and 32 extends completely around the body portion 22 as seen best in FIGS. 6 and 7. Ribs 30 and 32 respectively include portions 30a and 32a that project farther inward along the longer pair of side walls 24 than do rib portions 30b and 32b along the shorter pair of side walls 26.

As seen with combined reference to FIGS. 1 and 7, a generally flat bottom wall 34 closes the bottom end of the container body portion 22. This bottom wall 34 has a central groove 36 that is partially interrupted by a strengthening web 38 whose lower edge is curved in a downwardly opening configuration. On opposite sides of the web 38, the groove 36 diverges in an outward direction until just adjacent the longer pair of side walls where it sharply converges.

With reference to FIGS. 1 and 6, the container 20 also includes a top closure 40 for closing the top end of the container body portion 22. This top closure 40 includes an upper handle 42 located centrally. Top closure 40 also includes a spout 44 that projects upwardly in a vertical direction perpendicular to the bottom wall 34.

Figure 2:
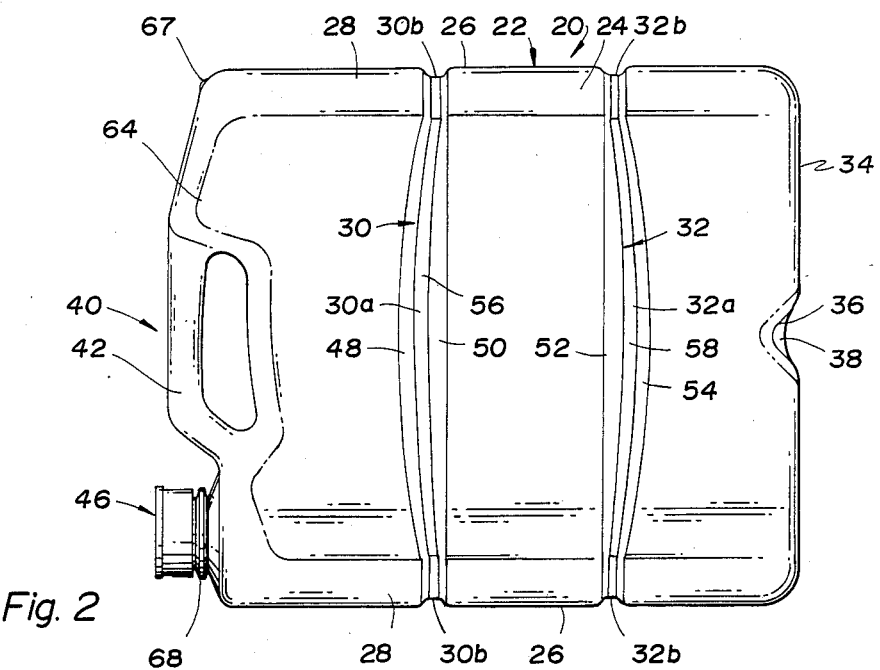
FIG. 2 is a side elevation view taken in the same direction as FIG. 1 but with the container shown positioned sideways for dispensing its liquid contents.
Figures 3, 4, 5:
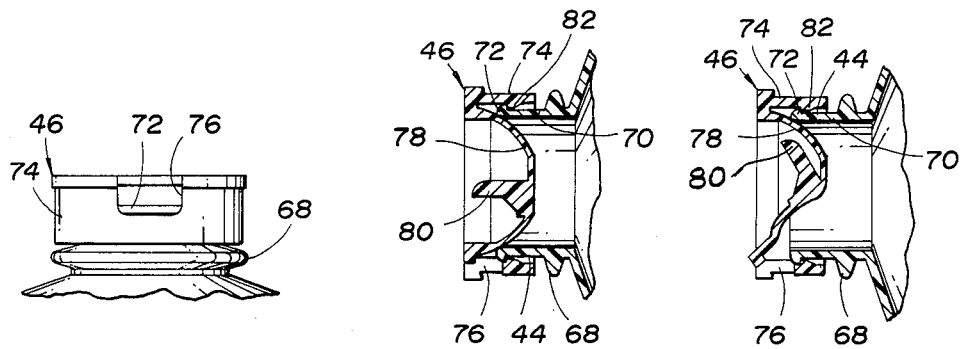
FIG. 3 is an elevation view taken along the direction of line 3—3 in FIG. 1 to illustrate a unitary valve of the container.
FIG. 4 is a sectional view taken in the same direction as FIG. 2 through a spout of the container and its unitary valve which is shown in a closed position.
FIG. 5 is a view similar to FIG. 4 but with the valve shown in an open position.

As is hereinafter more fully described, a unitary valve 46 is mounted on the spout 44 to provide dispensing of liquid contents of container 20. To perform the dispensing, the container is tipped sideways such that the valve 46 is located at the bottom extremity of the container as shown in FIG. 2 so that substantially all of the contents will flow through the valve by gravity to permit emptying of the container. As is hereinafter more fully described, valve 46 has a normally closed position as shown in FIG. 4 to close the spout 44 but is manually movable to an open position as shown in FIG. 5 to permit dispensing of the liquid contents of the container in its sideways oriented position.

Figure 8:
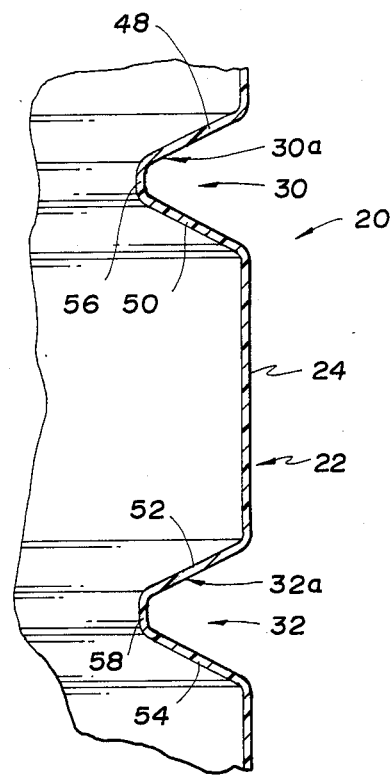
FIG. 8 is a sectional view taken along line 8—8 of FIG. 6 through a body portion of the container to illustrate its rib construction along a longer pair of side walls.
Figure 9:
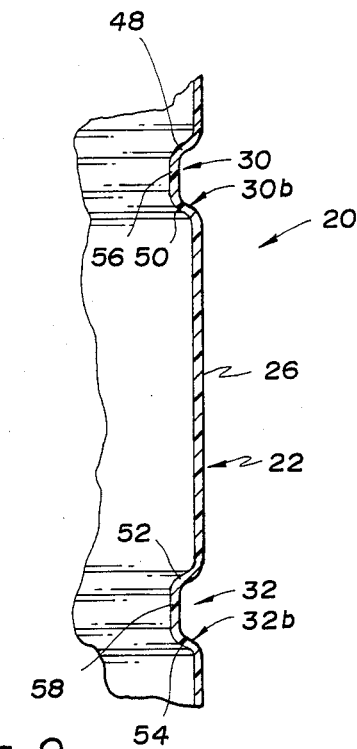
FIG. 9 is a sectional view taken along the direction of line 9—9 in FIG. 6 through a body portion of the container to illustrate its rib construction along a shorter pair of side walls.

As illustrated in FIGS. 8 and 9, ribs 30 and 32 respectively include inclined rib walls 48, 50 and 52, 54. These rib walls 48, 50 and 52, 54 converge toward each other in an inward direction with respect to the container. Along the longer side walls 24 as illustrated in FIG. 1, the wall 48 of the upper rib 30 and the wall 54 of the lower rib 32 have curved shapes. The curved rib wall 48 is located at the upper extremity of rib 30 and has its curved shape projecting upwardly away from the lower rib 32. The curved rib wall 54 of the lower rib 32 is located at its lower extremity with its curved shape projecting downwardly away from the upper rib 30. At the inner extremity of the rib walls 48 and 50 as illustrated in FIGS. 8 and 9, ribs 30 and 32 are respectively provided with vertical connecting walls 56 and 58. Along the longer side wall 24 as illustrated in FIG. 1, these connecting walls 56 and 58 respectively have upwardly and downwardly extending configurations. This construction of the upper and lower ribs 30 and 32 has been found effective in providing high strength that gives the container particular utility especially when utilized in the size range of about 2½ to 3 gallons.

Figure 10:
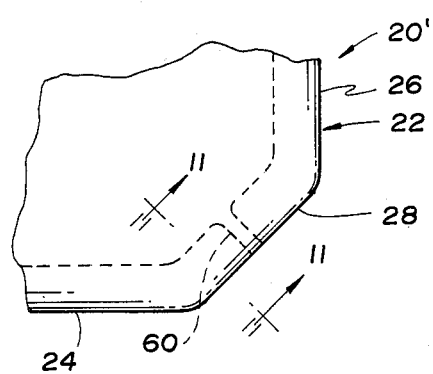
FIG. 10 is a partial top plan view of a modified embodiment that includes vertically extending web reinforcers at the ribs adjacent the junction of the side walls.
Figure 11:
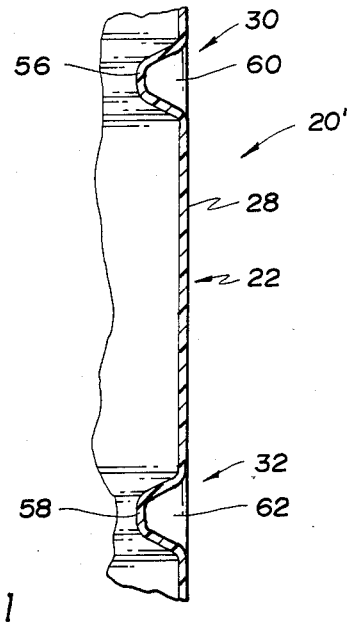
FIG. 11 is a sectional view taken along line 11—11 of FIG. 10 through the body portion of the container to illustrate the construction of the rib reinforcers.

With reference to FIGS. 10 and 11, a modified version of the container 20' has a construction similar to the container illustrated in FIGS. 1 through 9 but has deeper a rib construction at the side wall junctions 28 and along the shorter pair of side walls 26. In addition, the container includes vertically extending web reinforcers 60 and 62 on the upper and lower ribs at each of the side wall junctions 28. These web reinforcers 60 and 62 prevent accordion like comparison of the container when it is subjected to vertical loading and thereby provide a more rigidified structure.

With combined reference to FIGS. 1 and 6, the handle 42 of top closure 40 is located centrally between the shorter pair of side walls 26. Spout 44 on which the unitary valve 46 is mounted is located between the handle 42 and the left shorter side wall 26. At the right of the handle 42, the container includes an upwardly projecting hump 64 whose upper surface 66 is inclined downwardly away from the handle toward the adjacent shorter side wall 26. Hump 64 includes a vent projection 67 that can be cut to admit air into the container as its contents are dispensed. Vent projection 67 is preferably located within a recess 67a shown in FIG. 6 so as to be protected during handling and storage.

As illustrated in FIGS. 1 and 3 through 5, the spout 44 has a compacted construction formed during the blow molding and includes a lower flange 68 that may be continuous as illustrated or of an interrupted construction. This flange 68 can be used to provide container sensing and location in automated operations for filling the container and securing the unitary valve 46 onto the spout. An annular wall 70 of spout 40 projects upwardly from the flange 68 and has an upper extremity including an annular rib 72 that projects outwardly in order to secure the valve 46 in position.

As best seen in FIGS. 3 through 6, the valve 46 is made from a suitable flexible plastic and includes an annular wall 74 that receives the annular wall 70 of the spout on the container. An opening 76 is formed in the wall 74 as best seen in FIG. 3. At its upper end, the annular wall 74 is connected to a flexible closure wall 78 that normally projects into the spout wall 70 to seal against this wall adjacent the inner side of rib 72. A projection 80 is supported on the closure wall 78 and is manually moved from the closed valve position of FIG. 4 to the open valve position of FIG. 5 in order to permit liquid contents to be dispensed by gravity through the opening 76. After the dispensing is completed, the projection 80 is manually released such that the normal shape of the closure wall 78 returns the valve to the closed position of FIG. 4. A rib 82 is provided on the inside of valve wall 74 at the opposite end thereof as the end connected to the closure wall 78. This rib 82 extends inwardly and engages the outwardly extending rib 72 on the spout in order to secure the valve in position. The compacted construction of the spout 44 provides a more rigid construction that permits the fluid tight securement of the unitary valve 46.

With reference to FIGS. 6 and 7, the container 20 has a central mold line 84 at which the mold sections are engaged to enclose the cavity in which the container is molded by a blowing operation.

While the best modes for carrying out the invention have been described in detail, those familiar with the art to which this invention relates will recognize various alternatives, designs and embodiments for practicing the invention as defined by the following claims.

What is claimed is:

1. A plastic blow-molded container for liquids comprising: a body portion size to hold a plurality of gallons of liquid contents and having bottom and top ends; said body portion including first and second pairs of generally flat side walls; one of the pairs of side walls being longer than the other to provide the body portion with an elongated rectangular shape; at least one inwardly projecting rib extending completely around the body portion along each side wall thereof; said rib having upper and lower rib walls along the longer side walls with one of these rib walls having a flat shape and with the other rib wall having a curved shape; the rib having a vertical connecting wall that connects the upper and lower rib walls along the longer pair of side walls and has an inwardly curved shape; a generally flat bottom wall for closing the bottom end of the body portion; a top closure for closing the top end of the body portion; said top closure being unitary with the body portion and the bottom wall and including an upper handle located centrally with respect to both the longer and shorter pairs of side walls of the body portion; said top closure also including a spout that projects upwardly in a vertical direction perpendicular to the bottom wall located toward one of the shorter side walls from the handle; said top closure further including an upwardly projecting vent hump located toward the other shorter side wall from the handle on the opposite side thereof as the spout; and a unitary valve mounted on the spout and movable from a closed position to an open position to permit dispensing of liquid contents of the container when supported sideways on said one shorter side wall of the body portion.

2. A container as in claim 1 wherein the rib projects farther inward along the longer pair of side walls than along the shorter pair of side walls.

3. A container as in claim 2 wherein the body portion includes a pair of the ribs which extend around all of the side walls at upper and lower locations.

4. A container as in claim 2 wherein the upper and lower rib walls are inclined and converge toward each other in an inward direction.

5. A container as in claim 4 wherein, along the longer side walls, the upper rib has the upper rib wall thereof curved and the lower rib wall thereof flat, and the lower rib has the lower rib wall thereof curved and the upper rib wall thereof flat.

6. A container as in claim 5 wherein the vertical connecting wall of each rib extends completely around the body portion along both the longer and shorter pairs of side walls.

7. A container as in claim 2, 3, 4, 5 or 6 which includes vertically extending web reinforcers at each rib adjacent the junctions of the side walls.

8. A container as in claim 2, 3, 4, 5 or 6 wherein the spout includes a lower flange, an annular wall that projects upwardly from the flange, and an annular rib on the upper extremity of the annular wall.

9. A plastic blow-molded container for liquids comprising: a body portion sized to hold a plurality of gallons of liquid contents and having first and second pairs of side walls; both pairs of the side walls being generally flat and one pair having a substantially longer horizontal extent than the other pair; upper and lower inwardly projecting ribs extending completely around the body portion along each side wall thereof; the ribs projecting farther inward along the longer pair of side walls than along the shorter pair of side walls to provide the body portion with an elongated rectangular shape; each rib having upper and lower rib walls; the lower rib wall of the upper rib and the upper rib wall of the lower rib having flat shapes along the longer pair of side walls; the upper rib wall of the upper rib and the lower rib wall of the lower rib having curved shapes along the longer pair of side walls; each rib having a vertical connecting wall extending completely around the body portion and connecting the upper and lower rib walls thereof with an inwardly curved shape along the longer pair of side walls; a generally flat bottom wall for closing the bottom end of the body portion; a top closure for closing the top end of the body portion; said top closure being unitary with the body portion and the bottom wall and including an upper handle located centrally between both the longer and shorter pairs of side walls; the top closure also including a spout that projects upwardly between the handle and one of the shorter side walls; said spout projecting in a vertical direction perpendicular to the bottom wall; said top closure further including an upwardly projecting vent hump located toward the other shorter side wall from the handle on the opposite side thereof as the spout; and a unitary valve mounted on the spout and movable from a closed position to an open position to permit dispensing of liquid contents of the container when supported sideways on said one shorter side wall of the body portion.

10. A plastic blow-molded container for liquids comprising: a body portion sized to hold a plurality of gallons of liquid contents and having first and second pairs of side walls; both pairs of the side walls being generally flat and one pair having a substantially longer horizontal extent than the other pair to provide the body portion with an elongated rectangular shape; upper and lower inwardly projecting ribs extending completely around the body portion along each side wall thereof; the ribs projecting farther inward along the longer pair of side walls than along the shorter pair of side walls; each rib having upper and lower rib walls; the lower rib wall of the upper rib and the upper rib wall of the lower rib having flat shapes along the longer pair of side walls; the upper rib wall of the upper rib and the lower rib wall of the lower rib having curved shapes along the longer pair of side walls; each rib having a vertical connecting wall extending completely around the body portion and connecting the upper and lower rib walls thereof with an inwardly curved shape along the longer pair of side walls; a generally flat bottom wall for closing the bottom end of the body portion; a top closure for closing the top end of the body portion; said top closure being unitary with the body portion and the bottom wall and including an upper handle located centrally between both the longer and shorter pairs of side walls; the top closure also including a spout located between the handle and one of the shorter side walls; said spout including a lower flange, an annular wall that projects upwardly from the lower flange in a vertical direction perpendicular to the bottom wall, and an annular rib on the upper extremity of the annular wall; said top closure further including an upwardly projecting vent hump located toward the other shorter side wall from the handle on the opposite side thereof as the spout; and a unitary valve mounted on the annular wall of the spout and movable from a closed position to an open position to permit dispensing of liquid contents of the container when supported sideways on said one shorter side wall of the body portion.

* * * * *

UNITED STATES PATENT AND TRADEMARK OFFICE
CERTIFICATE OF CORRECTION

PATENT NO. : 4,579,260

DATED : April 1, 1986

INVENTOR(S) : William C. Young et al

It is certified that error appears in the above-identified patent and that said Letters Patent is hereby corrected as shown below:

Column 1, line 25, "244,639" should read -- 224,639 --.

Column 4, line 60, "comparison" should read -- compression --.

Signed and Sealed this

Fifth Day of August 1986

[SEAL]

Attest:

DONALD J. QUIGG

Attesting Officer

Commissioner of Patents and Trademarks